(12) United States Patent
Yuan et al.

(10) Patent No.: US 10,460,229 B1
(45) Date of Patent: Oct. 29, 2019

(54) DETERMINING WORD SENSES USING NEURAL NETWORKS

(71) Applicant: Google LLC, Mountain View, CA (US)

(72) Inventors: Dayu Yuan, San Jose, CA (US); Ryan P. Doherty, San Jose, CA (US); Colin Hearne Evans, San Mateo, CA (US); Julian David Christian Richardson, Palo Alto, CA (US); Eric E. Altendorf, San Francisco, CA (US)

(73) Assignee: Google LLC, Mountain View, CA (US)

( * ) Notice: Subject to any disclaimer, the term of this patent is extended or adjusted under 35 U.S.C. 154(b) by 46 days.

(21) Appl. No.: 15/464,053

(22) Filed: Mar. 20, 2017

Related U.S. Application Data

(60) Provisional application No. 62/310,508, filed on Mar. 18, 2016.

(51) Int. Cl.
  *G06F 17/00* (2019.01)
  *G06N 3/04* (2006.01)
  *G06F 17/27* (2006.01)

(52) U.S. Cl.
  CPC ......... *G06N 3/0445* (2013.01); *G06F 17/271* (2013.01); *G06F 17/274* (2013.01); *G06F 17/2785* (2013.01)

(58) Field of Classification Search
  CPC ................ G06N 3/084; G06F 17/2705; G06F 17/30684; G06F 17/2247; G06F 17/271; G06F 17/2735; G06F 17/279; G06F 17/30011; G06F 17/30401; G06F 17/30707; G06F 17/30958; G06K 9/00422; G06K 9/00463
  See application file for complete search history.

(56) References Cited

U.S. PATENT DOCUMENTS 8,275,607 B2 * 9/2012 Toutanova .......... G06F 17/2755
  704/1
8,463,593 B2 * 6/2013 Pell ..................... G06F 17/2785
  704/9

(Continued)

OTHER PUBLICATIONS

Baroni et al. "Don't count, predict! A systematic comparison of context-counting vs. context predicting semantic vectors," ACL (1) Jun. 22, 2014, 10 pages.

(Continued)

*Primary Examiner* — Edgar X Guerra-Erazo
(74) *Attorney, Agent, or Firm* — Fish & Richardson P.C.

(57) ABSTRACT

Methods, systems, and apparatus, including computer programs encoded on computer storage media, for disambiguating word sense. One of the methods includes maintaining a respective word sense numeric representation of each of a plurality of word senses of a particular word; receiving a request to determine the word sense of the particular word when included in a particular text sequence, the particular text sequence comprising one or more context words and the particular word; determining a context numeric representation of the context words in the particular text sequence; and selecting a word sense of the plurality of word senses having a word sense numeric representation that is closest to the context numeric representation as the word sense of the particular word when included in the particular text sequence.

14 Claims, 5 Drawing Sheets

(56) References Cited

U.S. PATENT DOCUMENTS

| | | | | |
|---|---|---|---|---|
| 2005/0080613 | A1* | 4/2005 | Colledge | G06F 17/2785 704/9 |
| 2006/0235843 | A1* | 10/2006 | Musgrove | G06F 16/3344 |
| 2009/0094019 | A1* | 4/2009 | Snow | G06F 17/2755 704/9 |
| 2013/0138696 | A1* | 5/2013 | Turdakov | G06F 16/367 707/794 |
| 2015/0006155 | A1* | 1/2015 | Tanigaki | G06F 17/277 704/9 |

OTHER PUBLICATIONS

Gabrilovich et al. "Computing semantic relatedness using Wikipedia based explicit semantic analysis," In IJCAI, vol. 7, Jan. 6, 2007, 6 pages.

Hockreiter et al. "Long short-term memory," Neural computation 9(8) Nov. 15, 1997, 46 pages.

Iacobacci et al. "Sensembed: Learning sense embeddings for word and relational similarity," Proceedings of the 53$^{rd}$ Annual Meeting of the Association for Computational Linguistics and the 7$^{th}$ International Joint Conference on Natural Language Processing (vol. 1: Long Paper), Beijing, Chine, Jul. 2015, 11 pages.

Kim et al. "Character-aware neural language models," arXiv preprint arXiv 1508.06615v4, Dec. 1, 2015, 9 pages.

Lesk. "Automatic sense disambiguation using machine readable dictionaries: How to tell a pine cone from an ice cream cone," Proceedings of the 5$^{th}$ Annual International Conference on Systems Documentation. New York, New York, Jun. 1986, 3 pages.

Levy et al. "Neural word embedding as implicit matrix factorization," Advances in Neural Information Processions Systems, 2014, 9 pages.

Mikolov et al. "Extensions of recurrent neural network language model," IEEE International Conference on Acoustics, Speech and Signal Processing, May 22, 2011, 4 pages.

Miller et al. "A semantic concordance," Proceedings of the workshop on Human Language Technology, Associates for Computational Linguistics, Mar. 21, 1993, 6 pages.

Moro et al. "Semeval-2015 task 13: multilingual all-words sense disambiguation and entity linking," Proceedings of SemEval, Jun. 4, 2015, 10 pages.

Moro et al. "Entity linking meets word sense disambiguation: a unified approach," Transaction of the Association for Computational Linguistics, 2, May 31, 2014, 14 pages.

Navigli et al. "BabelNet:The automatic construction, evaluation and application of a wide-coverage multilingual semantic network," Artificial Intelligence, 193, Dec. 1, 2012, 34 pages.

Navigli et al. "Semeval-2007 task 07: Coarse-grained English all-words task," Proceedings of the 4$^{th}$ International Workshop on Semantic Evaluations, Association for Computational Linguistics, Jun. 23, 2007, 6 pages.

Navigli et al. "Semeval-2013 task 12: Multilingual word sense disambiguation," Second Joint Conference on Lexical and Computational Semantics vol. 2, Jun. 14, 2013, 10 pages.

Navigli. "Meaningful clustering of senses helps boost word sense disambiguation performance," Proceedings of the 21$^{st}$ International Conference on Computational Linguistics and the 44$^{th}$ Annual Meeting of the Association for Computational Linguistics, Jul. 17, 2006, 8 pages.

Navigli. "Word sense disambiguation: A survey," ACM Computing Surveys, 41(2), Feb. 1, 2009, 69 pages.

Neelakantan et al. "Efficient non-parametric estimation of multiple embeddings per word in vector space," Proceedings of the 2014 Conference on Empirical methods in Natural Language Processing, Apr. 24, 2015, 12 pages.

Ponzetto et al. "Knowledge-rich word sense disambiguation rivaling supervised systems," Proceedings of the 48$^{th}$ Annual Meeting of the Association for Computational Linguistics, Jul. 11, 2010, 10 pages.

Pradhan et al. "Semeval-2007 task 17: English lexical sample, srl and all words," Proceedings of the 4$^{th}$ International Workshop on Semantic Evaluations, Jun. 23, 2007, 6 pages.

Ravi et al. "Large scale distributed semi-supervised learning using streaming approximation," AISTATS, 2016, 10 pages.

Rothe et al. "AutoExtend: Extending word embeddings to embeddings for synsets and lexemes," arXiv preprint arXiv1507.01127 Jul. 4, 2015, 11 pages.

Socher et al. "Recursive deep models for semantic compositionality over a sentiment treebank," Proceedings of the conference on empirical methods in natural language processing, vol. 1631, Oct. 18, 2013, 12 pages.

Sundermeyer et al. "LSTM neural networks for language modeling," In Interspeech, Sep. 2012, 4 pages.

Sutskever et al. "Sequence to sequence learning with neural networks," Advances in Neural Information Processing Systems, 2014, 9 pages.

Taghipour et al. "Semi-supervised word sense disambiguation using word embeddings in general and specific domains," HLT-NAACL, 2015, 10 pages.

Talukdar et al. "New regularized algorithms for transductive learning," Machine Learning and Knowledge Discover in Databases, 2009, 45 pages.

Turain et al. "Word representations: a simple and general method for semi-supervised learning," Proceedings of the 48$^{th}$ annual meeting of the association for computational linguistics, Jul. 11, 2010, 11 pages.

Zhong et al. "It makes sense: A wide-coverage word sense disambiguation system for free text," Proceedings of the ACL 2010 System Demonstrations. Association for Computational Linguistics, Jul. 13, 2010, 8 pages.

Mikolov et al., "Efficient Estimation of Word Representations in Vector Space," (Sep. 7, 2013) [online] (retrieved from https://arxiv.org/pdf/1301.3781.pdf), 12 pages.

* cited by examiner

DETERMINING WORD SENSES USING NEURAL NETWORKS

CROSS-REFERENCE TO RELATED APPLICATION

This application claims priority to U.S. Provisional Application No. 62/310,508, filed on Mar. 18, 2016. The disclosure of the prior application is considered part of and is incorporated by reference in the disclosure of this application.

BACKGROUND

This specification relates to determining word senses using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes how a system implemented as computer programs on one or more computers in one or more locations can determine the word sense of a word when the word appears in a text sequence with one or more context words.

In particular, the system maintains a respective word sense numeric representation of each of multiple word senses of the word. The system receives a request to determine the word sense of the word when included in a particular text sequence that includes one or more context words and the particular word. The system determines a context numeric representation of the context words in the particular text sequence and selects the word sense having the word sense numeric representation that is closest to the context numeric representation as the word sense of the word when appearing in the particular text sequence.

Particular embodiments of the subject matter described in this specification can be implemented so as to realize one or more of the following advantages. The word sense disambiguation system described in this specification can effectively disambiguate the word sense of words appearing in text sequences based on only the other words in the text sequence. The word sense disambiguation system can effectively incorporate unlabeled and therefore readily available text data when determining the numeric representation for a given word sense rather than needing to rely solely on labeled text data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
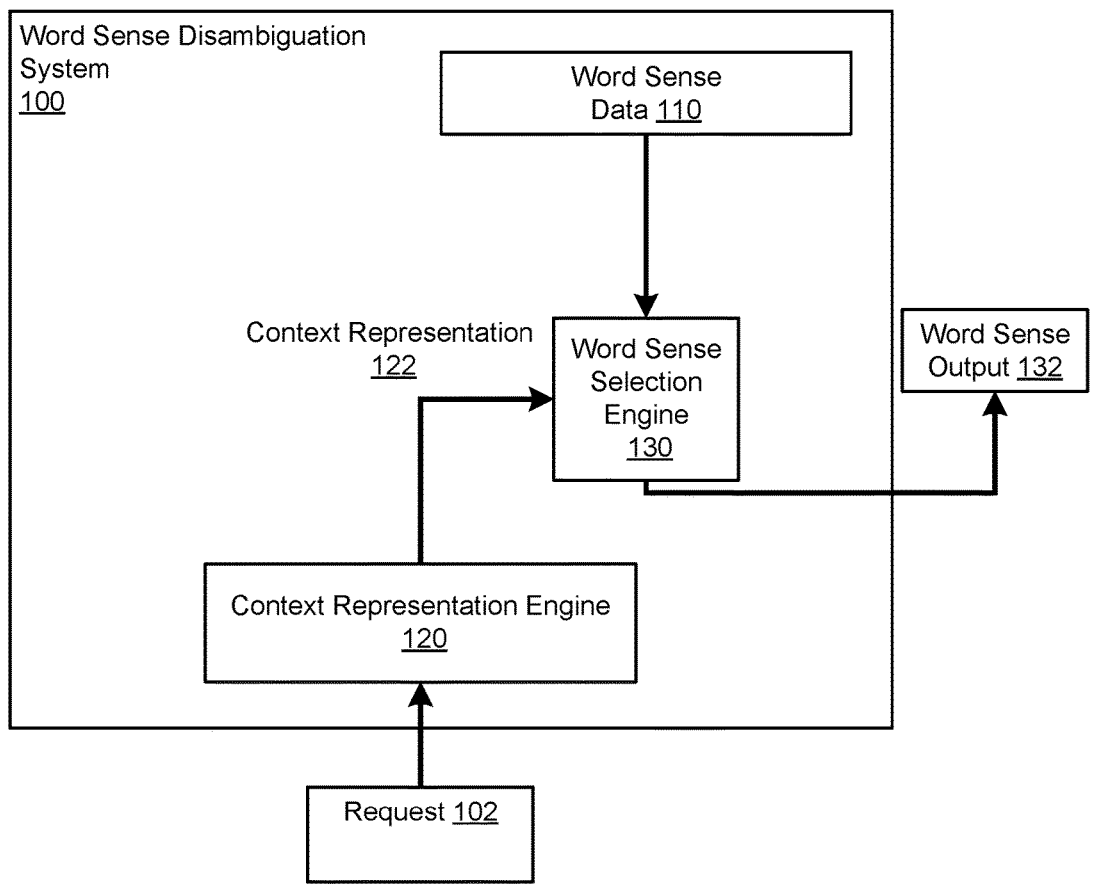
FIG. 1 shows an example word sense disambiguation system.

FIG. 1 shows an example word sense disambiguation system 100.

The word sense disambiguation system 100 is an example of a system implemented as computer programs on one or more computers in one or more locations, in which the systems, components, and techniques described below can be implemented.

The word sense disambiguation system 100 receives word sense requests 102 and generates a respective word sense output 132 in response to each received word sense request 102.

Each word sense request is a request to determine the word sense of a word when appearing in a text sequence, i.e., in a particular context. The word sense output 132 generated by the system 100 for a given request 102 identifies the word sense of the word when appearing in the text sequence specified by the request.

A word sense of a given word is the meaning of the word when used in a particular context. Because many words have different meanings when used in different contexts, the system 100 disambiguates the possible word senses for a word using the context for the word, i.e., the other words in the text sequence identified in the request, to select the appropriate word sense to return in response to a received request. For example, when used in the sequence "I went fishing for bass," the word "bass" has the sense "fish," while when used in the sequence "My friend plays the bass," the word "bass" has the sense "musical instrument."

In some implementations, once generated, the word sense disambiguation system 100 provides the word sense output 132 as input to another system for further processing. For example, the word sense disambiguation system 100 can provide the word sense output 132 as input to a natural language processing system that analyzes the input text segment identified in the request, e.g., performs sentiment analysis, question answering, summarization, or another natural language processing task.

Instead of or in addition to providing the word sense output 132 as input to another system, the word sense disambiguation system 100 can store the disambiguated word sense or provide data specifying the disambiguated word sense for presentation to a user of the word sense disambiguation system 100.

In particular, the word sense disambiguation system 100 maintains word sense representation data 110 that includes, for each word in a vocabulary of words, a respective word sense numeric representation for each of a set of word senses of the word. Thus, using the example above, the system representation data 110 may include, for the word "bass," one representation for the sense "fish," another representation for "musical instrument," and so on.

Each word sense numeric representation is an ordered collection of numeric values, e.g., a vector of floating point numbers.

Because many words can, depending on their context of use, have multiple different lemmas, multiple different parts of speech, or both, the word sense representation data 110 also specifies, for each word sense of a given word, the lemma and part of speech of the given word when having that word sense.

Generating the word sense representation data 110 is described below with reference to FIG. 5.

The system 100 includes a representation generation engine 120 and a word sense selection engine 130.

In response to a request 102 that requests the word sense of a particular word when the word appears in a particular text sequence, the representation generation engine 120 generates a context numeric representation 122 from the context words in the particular text sequence. The context words are the words in the text sequence other than the word for which the word sense is being requested. Like the word sense numeric representations, a context numeric representation is an ordered collection of numeric values, e.g., a vector of floating point numbers. Generating context numeric representations is described below with reference to FIGS. 2-4.

The word sense selection engine 130 selects a word sense for the particular word using the context word representation 122 and from the word senses for the particular word that are identified in the data 112. In particular, of the word senses for the particular word that are associated with the same lemma and the same part of speech as the particular word in the particular text sequence, the word sense selection engine 130 selects the word sense having the word sense numeric representation that is closest to the context numeric representation 122 as the word sense to return in response to the request 102.

Figure 2:
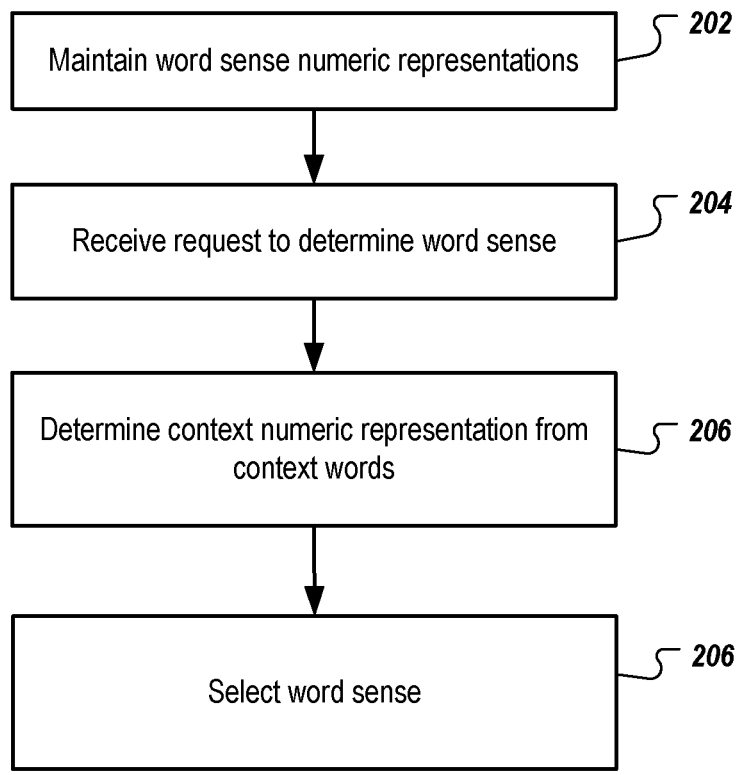
FIG. 2 is a flow diagram of an example process for determining the word sense of a word appearing in a particular text sequence.

FIG. 2 is a flow diagram of an example process 200 for determining a word sense for a word that appears in a particular text sequence. For convenience, the process 200 will be described as being performed by a system of one or more computers located in one or more locations. For example, a word sense disambiguation system, e.g., the word sense disambiguation system 100 of FIG. 1, appropriately programmed, can perform the process 200.

The system maintains word sense numeric representations for various words in a vocabulary of words (step 202). In particular, for each word in the vocabulary that can potentially multiple word senses, the system maintains data identifying a respective word sense numeric representation for each of the multiple word senses of the word.

The system receives a request to determine the word sense of a particular word in the vocabulary of words when the particular word appears in a particular text sequence (step 204). The text sequence includes the particular word and one or more context words.

The system determines a context numeric representation of the context words in the particular text sequence (step 206). The context numeric representation is an ordered collection of numeric values that includes the same number of numeric values as the maintained word sense numeric representations, i.e., has the same dimensionality as the word sense numeric representations.

The system can determine the context numeric representation in any of a variety of ways. One example process for determining the context numeric representation of the context words is described below with reference to FIG. 3.

Another example process for determining the context numeric representation is described below with reference to FIG. 4.

The system selects a word sense using the context numeric representation and the maintained word sense numeric representations for the word senses of the particular word (step 208).

In particular, the system selects the word sense (among the different word senses for the particular word) that has the word sense numeric representation that is the closest to the context numeric representation according to a distance metric. For example, the distance metric can be cosine similarity and the system can select the word sense that has the word sense numeric representation that has the highest cosine similarity with the context numeric representation.

In some cases, the particular word may be able to have multiple lemmas, multiple parts of speech, or both. In these cases, the system considers only the word sense numeric representations for word senses for the particular word that are associated with the same lemma and part of speech as the particular word has when used in the particular text sequence.

Figure 3:
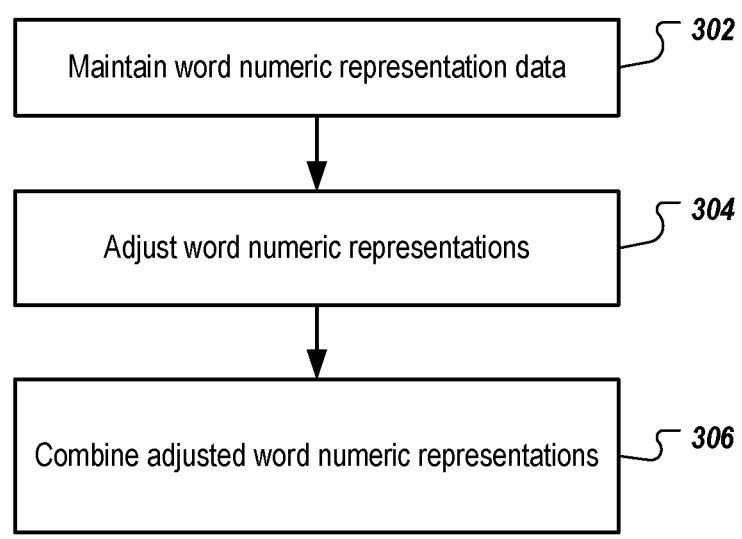
FIG. 3 is a flow diagram of an example process for determining a context numeric representation.

FIG. 3 is a flow diagram of an example process 300 for determining a context numeric representation. For convenience, the process 300 will be described as being performed by a system of one or more computers located in one or more locations. For example, a word sense disambiguation system, e.g., the word sense disambiguation system 100 of FIG. 1, appropriately programmed, can perform the process 300.

The system maintains a respective word numeric representation for each word in the vocabulary of words (step 302). The word numeric representations are ordered collections of numeric values that have the same dimensionality as the context numeric representations and the word sense representations and are generated so that the relative locations of the representations reflect semantic and syntactic similarities between the corresponding words.

Word representations having these characteristics can be generated by training a machine learning system configured to process each word in the vocabulary of words to obtain a respective numeric representation of each word in the vocabulary and to associate each word in the vocabulary with the respective numeric representation of the word. Example techniques for training such a system and generating the representations are described in Tomas Mikolov, Kai Chen, Greg S. Corrado, and Jeffrey Dean, Efficient estimation of word representations in vector space, International Conference on Learning Representations (ICLR), Scottsdale, Ariz., USA, 2013.

The system adjusts the word numeric representation for each of the context words based on a rank of the context words in a ranking of the word in the vocabulary of words, e.g., a ranking based on frequency of occurrence of the words in the vocabulary in a text corpus, to generate a respective adjusted word numeric representation for each of the context words (step 304). For example, the system can generate the adjustment factor from the rank of the context word and then multiply the word representation by the adjustment factor to generate the adjusted representation. In some cases, the adjustment factor is equal to the logarithm of the rank plus a constant value, e.g., one.

The system combines the adjusted word numeric representations to generate the context numeric representation (step 306). For example, the system can sum the adjusted word numeric representations, average the adjusted word numeric representations, or apply a different combining function to the adjusted word numeric representations to generate the context numeric representation.

Figure 4:
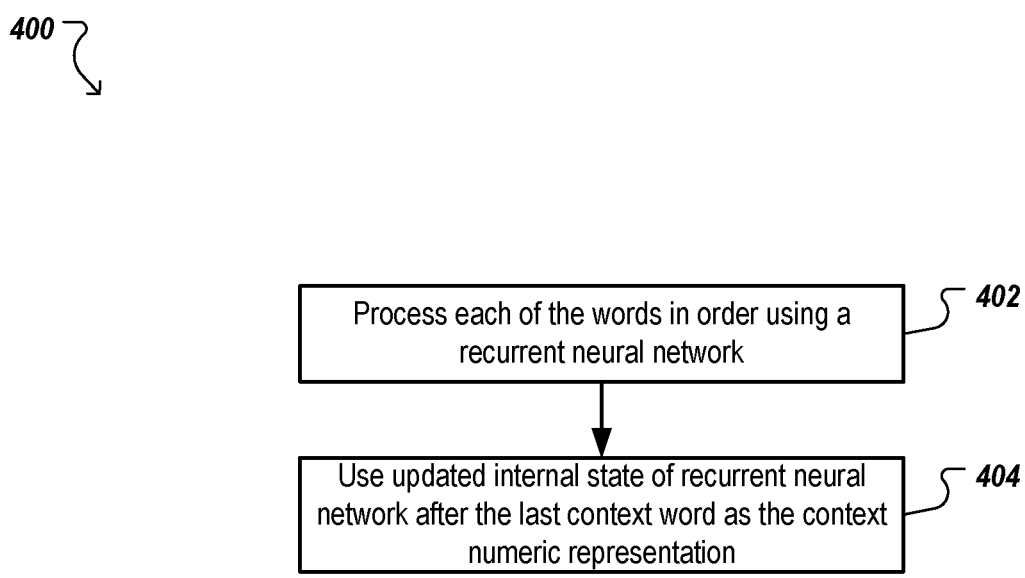
FIG. 4 is a flow diagram of another example process for determining a context numeric representation.

FIG. 4 is a flow diagram of another example process 400 for determining a context numeric representation. For convenience, the process 400 will be described as being performed by a system of one or more computers located in one or more locations. For example, a word sense disambiguation system, e.g., the word sense disambiguation system 100 of FIG. 1, appropriately programmed, can perform the process 400.

The system processes each of the each of the context words in order, i.e., in the order in which the context words appear in the particular text sequence, using a recurrent neural network, e.g., an LSTM neural network (step 402).

The recurrent neural network is a recurrent neural network that has been configured through training to, for each context word, process the context word through one or more recurrent neural network layers to update a current internal state of the recurrent neural network and to process the updated internal state after the last context word in the order through one or more output layers to generate a respective score for each of a plurality of words that represents a likelihood that the word is a missing word in the particular text sequence, i.e., an additional word in a predetermined position in the particular text sequence relative to the context words. The recurrent neural network can have been trained to generate the scores on a set of training sequences that each include one or more training context words and an additional word using a backpropagation through time training technique.

The recurrent neural network is also configured so that the internal state has the same dimensionality as the context numeric representation and the word sense numeric representations.

The system uses the updated internal state after the last context word in the order as the context numeric representation (step 404). In some cases, because the scores generated by the recurrent neural network are not used by the system, the system processes each context word only through the one or more recurrent neural network layers of the recurrent neural network, i.e., and does not process any internal states using the one or more output layers. For example, the system can instantiate a neural network that includes only the recurrent neural network layer(s) with their trained parameter values and use the instantiated neural network to generate the updated internal state after the last context word.

Figure 5:
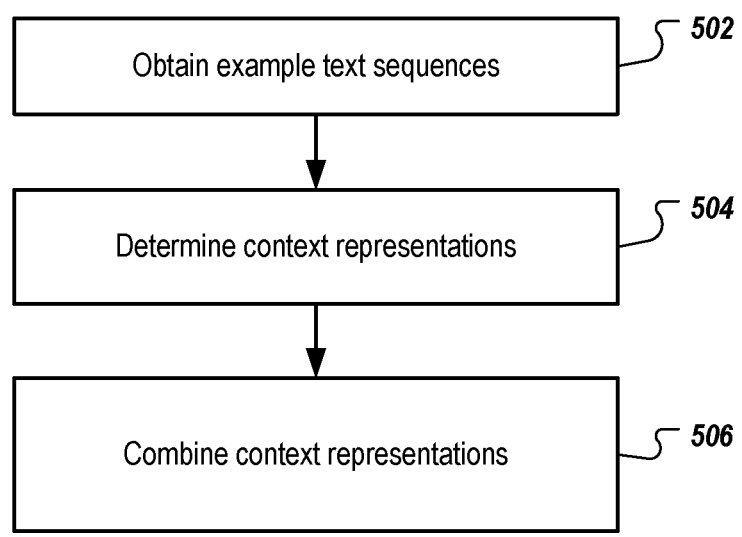
FIG. 5 is a flow diagram of an example process for generating a word sense numeric representation of a particular word sense of a particular word.

FIG. 5 is a flow diagram of an example process 500 for generating a word sense numeric representation for a particular word sense of a particular word. For convenience, the process 500 will be described as being performed by a system of one or more computers located in one or more locations. For example, a word sense disambiguation system, e.g., the word sense disambiguation system 100 of FIG. 1, appropriately programmed, can perform the process 500.

The system obtains multiple example text sequences that each include the particular word and one or more respective context words (step 502). In particular, the particular word has been classified as having the particular word sense in each of these example text sequences. If the particular word can have multiple lemmas, multiple parts of speech, or both, the particular word has also been classified as having the same lemma and part of speech in each of these example text sequences.

Generally, at least a portion of the multiple example text sequences have been classified by an external system as being sequences that include the particular word when the particular word has the particular word sense.

In some implementations, the system generates a label-propagation graph from the already classified text sequences, with nodes in the graph representing the already classified text sequences. The system then obtains additional, unlabeled sequences that also include the particular word when the word has the particular lemma. The system can then determine whether any of the additional, unlabeled sequences are sufficiently similar to the sequences represented by nodes in the graph using label propagation, and, if so, uses those sufficiently similar sequences as additional sequences in which the word has the particular word sense.

The system determines a respective context numeric representation for each example text sequence (step 504). That is, for each example text sequence, the system determines a context numeric representation of the context words in the example text sequence. The system determines the context numeric representations using the same technique as used to determine context numeric representations when a request for a word sense is received, e.g., either the technique described above with reference to FIG. 3 or the technique described above with reference to FIG. 4.

The system combines, e.g., sums or averages, the context numeric representations for the example text sequences to generate the word sense numeric representation for the particular word sense of the particular word (step 506).

The system can repeat the process 500 for each word sense of the particular word to generate a respective word sense numeric representation for each of the possible word senses of the particular word. Similarly, the system can also perform the process 500 for each possible word sense of each of the words in the vocabulary to generate the word sense numeric representations for each of the possible word senses of each of the words in the vocabulary.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them.

Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
    generating a respective word sense numeric representation of each of a plurality of word senses of a particular word, the generating comprising, for each of the plurality of word senses:
        obtaining a plurality of training text sequences for the word sense that each include the particular word and one or more respective training context words, wherein the particular word has been classified as having the particular word sense in each of the training text sequences,
        determining a respective training text sequence numeric representation for each of the training text sequences for the word sense by processing each of the training context words in order using a recurrent neural network; and
        determining the word sense numeric representation for the word sense from the respective training text sequence numeric representations for the training text sequences for the word sense;
    receiving a request to determine the word sense of the particular word when included in a particular text sequence, the particular text sequence comprising one or more context words and the particular word;
    determining a context numeric representation of the context words in the particular text sequence by processing each of the context words in the training text sequence in order using the recurrent neural network; and
    selecting a word sense of the plurality of word senses having a word sense numeric representation that is closest to the context numeric representation as the word sense of the particular word when included in the particular text sequence.

2. The method of claim 1, wherein each of the word senses is associated with a particular lemma and a particular part of speech, and wherein the particular word has the particular lemma and the particular part of speech in the particular text sequence.

3. The method of claim 1, wherein the word sense having the word sense numeric representation that is closest to the context numeric representation is the word sense having a word sense numeric representation that has the highest cosine similarity with the context numeric representation of any of the word sense numeric representations of any of the word senses in the plurality of word senses.

4. The method of claim 1, wherein the recurrent neural network is configured to:
    for each context word, process the context word to update a current internal state of the recurrent neural network; and
    process the updated internal state after the last context word in the order to generate a respective score for each of a plurality of words that represents a likelihood that the word is a missing word in the particular text segment; and
    wherein determining the context numeric representation of the context words comprises using the updated internal state after the last context word in the order as the context numeric representation.

5. The method of claim 4, wherein the order is the order in which the context terms appear in the particular text sequence.

6. The method of claim 4, wherein the recurrent neural network is a long short-term memory (LSTM) neural network.

7. One or more non-transitory computer-readable storage media encoded with instructions that, when executed by one or more computers, cause the one or more computers to perform operations comprising:
    generating a respective word sense numeric representation of each of a plurality of word senses of a particular word, the generating comprising, for each of the plurality of word senses:
        obtaining a plurality of training text sequences for the word sense that each include the particular word and one or more respective training context words, wherein the particular word has been classified as having the particular word sense in each of the training text sequences,
        determining a respective training text sequence numeric representation for each of the training text sequences for the word sense by processing each of the training context words in order using a recurrent neural network; and
        determining the word sense numeric representation for the word sense from the respective training text sequence numeric representations for the training text sequences for the word sense;
    receiving a request to determine the word sense of the particular word when included in a particular text sequence, the particular text sequence comprising one or more context words and the particular word;
    determining a context numeric representation of the context words in the particular text sequence by processing each of the context words in the training text sequence in order using the recurrent neural network; and
    selecting a word sense of the plurality of word senses having a word sense numeric representation that is closest to the context numeric representation as the word sense of the particular word when included in the particular text sequence.

8. The computer-readable storage media of claim 7, wherein each of the word senses is associated with a particular lemma and a particular part of speech, and wherein the particular word has the particular lemma and the particular part of speech in the particular text sequence.

9. The computer-readable storage media of claim 7, wherein the word sense having the word sense numeric representation that is closest to the context numeric representation is the word sense having a word sense numeric representation that has the highest cosine similarity with the context numeric representation of any of the word sense numeric representations of any of the word senses in the plurality of word senses.

10. The computer-readable storage media of claim 7, wherein the recurrent neural network is configured to:
    for each context word, process the context word to update a current internal state of the recurrent neural network; and
    process the updated internal state after the last context word in the order to generate a respective score for each of a plurality of words that represents a likelihood that the word is a missing word in the particular text segment; and
    wherein determining the context numeric representation of the context words comprises using the updated internal state after the last context word in the order as the context numeric representation.

11. A system comprising one or more computers and one or more storage devices storing instructions that, when executed by the one or more computers, cause the one or more computers to perform operations comprising:
    generating a respective word sense numeric representation of each of a plurality of word senses of a particular word, the generating comprising, for each of the plurality of word senses:
        obtaining a plurality of training text sequences for the word sense that each include the particular word and one or more respective training context words, wherein the particular word has been classified as having the particular word sense in each of the training text sequences,
        determining a respective training text sequence numeric representation for each of the training text sequences for the word sense by processing each of the training context words in order using a recurrent neural network; and
        determining the word sense numeric representation for the word sense from the respective training text sequence numeric representations for the training text sequences for the word sense;
    receiving a request to determine the word sense of the particular word when included in a particular text sequence, the particular text sequence comprising one or more context words and the particular word;
    determining a context numeric representation of the context words in the particular text sequence by processing each of the context words in the training text sequence in order using the recurrent neural network; and
    selecting a word sense of the plurality of word senses having a word sense numeric representation that is closest to the context numeric representation as the word sense of the particular word when included in the particular text sequence.

12. The system of claim 11, wherein each of the word senses is associated with a particular lemma and a particular part of speech, and wherein the particular word has the particular lemma and the particular part of speech in the particular text sequence.

13. The system of claim 11, wherein the word sense having the word sense numeric representation that is closest to the context numeric representation is the word sense having a word sense numeric representation that has the highest cosine similarity with the context numeric representation of any of the word sense numeric representations of any of the word senses in the plurality of word senses.

14. The system of claim 11, wherein the recurrent neural network is configured to:
    for each context word, process the context word to update a current internal state of the recurrent neural network; and
    process the updated internal instate after the last context word in the order to generate a respective score for each of a plurality of words that represents a likelihood that the word is a missing word in the particular text segment; and
    wherein determining the context numeric representation of the context words comprises using the updated internal state after the last context word in the order as the context numeric representation.

* * * * *

UNITED STATES PATENT AND TRADEMARK OFFICE
CERTIFICATE OF CORRECTION

PATENT NO.         : 10,460,229 B1
APPLICATION NO.    : 15/464053
DATED              : October 29, 2019
INVENTOR(S)        : Yuan et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 150 days.

Signed and Sealed this
Eleventh Day of August, 2020

Andrei Iancu
*Director of the United States Patent and Trademark Office*